United States Patent
Arnold et al.

(10) Patent No.: US 7,461,507 B2
(45) Date of Patent: Dec. 9, 2008

(54) HIGH RESPONSE COMPACT TURBOCHARGER

(75) Inventors: Steven Don Arnold, Rancho Palos Verdes, CA (US); Gary Vrbas, Wilmington, CA (US); Martin Verschoor, Rolling Hills Estates, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/570,334

(22) PCT Filed: Sep. 13, 2004

(86) PCT No.: PCT/US2004/029656

§ 371 (c)(1),
(2), (4) Date: Mar. 1, 2006

(87) PCT Pub. No.: WO2005/028877

PCT Pub. Date: Mar. 31, 2005

(65) Prior Publication Data

US 2006/0260309 A1 Nov. 23, 2006

(51) Int. Cl.
*F02B 33/44* (2006.01)

(52) U.S. Cl. ..................... 60/605.1; 60/605.2

(58) Field of Classification Search ............. 60/605.1, 60/605.2

See application file for complete search history.

(56) References Cited

U.S. PATENT DOCUMENTS

| | | | |
|---|---|---|---|
| 3,208,213 A | 9/1965 | Anderson | |
| 4,460,310 A | 7/1984 | Plunkett | |
| 5,406,796 A | 4/1995 | Hiereth et al. | |
| 5,584,174 A | 12/1996 | Bates et al. | |
| 5,937,650 A | 8/1999 | Arnold | |
| 6,050,095 A * | 4/2000 | Blake | 60/605.2 |
| 6,062,028 A * | 5/2000 | Arnold et al. | 60/612 |
| 6,145,313 A * | 11/2000 | Arnold | 60/605.2 |
| 6,269,642 B1 | 8/2001 | Arnold et al. | |
| 6,324,848 B1 * | 12/2001 | Gladden et al. | 60/612 |
| 6,418,723 B1 * | 7/2002 | Gladden | 60/612 |
| 6,601,388 B1 * | 8/2003 | Gladden | 60/606 |
| 6,948,314 B2 * | 9/2005 | Arnold et al. | 60/612 |

FOREIGN PATENT DOCUMENTS

| | | |
|---|---|---|
| EP | 0043017 | 1/1982 |
| GB | 434242 | 8/1935 |
| GB | 1146575 | 3/1969 |

* cited by examiner

*Primary Examiner*—Hoang M Nguyen
(74) *Attorney, Agent, or Firm*—Lee & Hayes LLP

(57) ABSTRACT

Turbochargers of this invention comprise a turbine housing and a turbine wheel rotatably disposed therein. A center housing is connected to the turbine housing, and a compressor housing is attached to the center housing. A compressor is rotatably disposed within the compressor housing, and comprises two impellers placed in back-to-back orientation. A movable member is disposed within the compressor housing to downstream of the compressor to control the flow of air within the compressor housing. The position of the movable member can be operated to control the amount of pressurized air that is produced by one of the compressor impellers to provide enhanced compressor operating efficiency throughout the operating range and mass flow requirements of the engine.

16 Claims, 15 Drawing Sheets

HIGH RESPONSE COMPACT TURBOCHARGER

FIELD OF THE INVENTION

This invention relates to turbochargers and, more specifically, to turbochargers comprising a dual compressor construction that are specially configured to provide a desired level of high efficiency, high response and provide a compact turbocharger package when compared to conventional single compressor turbochargers.

BACKGROUND OF THE INVENTION

As turbocharged diesel engines have developed to higher brake mean effective pressure (BMEP) levels, with low levels of legislated emissions, it has become increasingly difficult to match the turbine and compressor in conventional single compressor and/or single turbine turbochargers, and achieve the desired level of performance. Emissions regulations enacted but not yet in force, may force extreme levels of Exhaust Gas Recirculation to control NOx and Particulate Filters to control soot and particulate emissions. Generally, the compressor must provide the level of mass flow that the engine requires at its maximum power, and this requirement operates to set the size of the compressor. In general, the compressor inducer throat area, i.e., the portion of the compressor that meets incoming air and that is characterized by design parameters that include the inducer diameter, blade inlet angle, and blade blockage, determines the compressor flow. The boost pressure needed to achieve a given level of mass flow is a function of the engine design and flow characteristics. The speed of the compressor is determined by its diameter and impeller blade backward curvature. The turbine must produce the power necessary to drive the compressor at the speed demanded by the compressor to reach the boost pressure and mass flow required by the engine. Thus there is always a compromise to achieve the turbine match.

Radial turbines operate best when the turbine blade tip speed divided by the isentropic spouting velocity (commonly referred to as U/Co) is approximately 0.7. Unfortunately, several design features of future engines make this difficult to achieve. The maximum corrected flow of the turbine is a function of its size and blade curvature. Ultra-high boost pressures reduce the required maximum turbine corrected flow, as does the inclusion of exhaust gas recirculation (EGR). EGR essentially reduces the fresh air volumetric efficiency of the engine, thus requiring higher boost pressures to pass the required fresh air. This in turn requires more turbine power which is achieved by increasing the backpressure on the engine.

Other devices that increase the backpressure on the turbine such as diesel particulate filters, all types of catalysts, or turbo-compound turbines also operate to reduce the required turbine corrected flow. As the pressure at which the turbine discharges to is raised, and the pressure ratio of the turbine is held constant to produce the required power, the inlet pressure of the turbine is significantly increased. This increase in turbine inlet pressure results in higher density exhaust gas, and thus lower corrected flow. As the power densities have increased and the aforementioned devices have become more and more common, the challenge to correctly match the turbine and compressor has increased.

Achieving good low engine speed performance requires that the turbine flow be reduced to generate good boost pressures with the minimum exhaust energy that is available. This has given rise to the use of variable geometry turbines. In such variable geometry turbines the turbine geometry is configured to be controlled to reduce the flow area of the turbine and generate more backpressure. This higher backpressure results in an increased expansion ratio for the turbine, which functions to create more turbine power.

When taken to extremes, such as that seen when accelerating the engine rapidly from idle, the turbine performance is quite poor. There are several causes for this. First, the wheel and turbine nozzle are operating at far off design, and the U/Co is not in the optimum operating zone. Second, the turbine flow area is substantially closed resulting in a high-pressure loss through the flow control device (such as an adjustable vaned nozzle cascade).

Conventional turbochargers would have to be configured having a large compressor with a very small turbine due to the aforementioned reasons. To counteract this, it is possible to use a high trim (large inducer size) compressor, with high backward curvature to increase the turbocharger speed to improve the turbine match. The turbine can also be configured having a low trim turbine to match the flow characteristic and force the diameter of the turbine as large as possible. However, these design alternatives may not be desirable from other points of view such as fatigue life, packaging, efficiency, inertia, etc.

In conclusion, the future highly rated, low emission turbodiesel engine will require a fundamentally different concept of turbocharger design than is presently provided by conventional turbochargers comprising a single radial compressor driven by a single radial turbine.

To overcome the above-noted deficiency, different approaches have been taken that each involve using two turbochargers. The three most popular two-turbocharger configurations are commonly referred to as series, parallel/sequential, or staged. The common theme of all three concepts is that a small turbocharger (roughly half the size or smaller than a normal full range single turbocharger) is used at the low end of the speed range for best performance.

Enhanced transient performance is achieved by the initial use of a smaller turbocharger due to a number of reasons. First, the compressor is not operating near the surge line where efficiency is poor, but closer to the peak efficiency island. Second, the turbine is also much smaller and better matched for the low flows. This is true whether fixed geometry, wastegated and variable geometry turbines are used. For fixed geometry and wastegated turbines, the turbine housing A/r (which controls the flow characteristic) is closer to the optimum for efficiency. With a variable geometry turbine, the turbine size is reduced, and the nozzle setting becomes more open and reduces the flow loss through the vane cascade. Third, a smaller turbocharger has less rotating group inertia, thus less turbine power is consumed increasing the speed of the turbocharger and is applied to the compressor to generate boost pressure.

A second turbocharger matching problem is known to exist with a traditional single turbo approach, separate and apart from the turbine matching issues discussed above for these new engines. The improved engine responsiveness at low speed, combined with high power levels at full speed, has resulted in a compressor range problem. Utilizing state-of-the-art aerodynamic analysis to increase the flow range of the compressor has yielded impressive improvements. However they still fall short of engine manufacturer's expectations. The compressor surge line (a parameter in defining the compressor flow range) limits many engines' low speed torque.

This flow range issue has resulted in development work on variable geometry compressors as well as the use of two turbochargers as mentioned previously. While variable geometry compressors can improve the performance of the compressor, they add more complexity, moving parts, cost, and control elements to the engine. While multiple turbochargers in either staged, series, or parallel/sequential arrangement, can help improve engine performance at the low end of the speed range and have improved compressor range, they also add cost, complexity, weight, and packaging challenges to the engine.

It is, therefore, desirable that a turbocharger be constructed in a manner to provide a degree of turbocharger matching that enables the engine to produce the desired BMEP level and meet legislated emissions limits. It is desired that such a turbocharger be constructed in a matter that can permit retrofit or new application use with a minimum of ancillary modifications. It is further desired that such a turbocharger be constructed in a manner that is space efficient to promote efficient engine compartment packaging.

SUMMARY OF THE INVENTION

Turbocharger assemblies of this invention comprise a turbine housing, and a turbine wheel that is rotatably disposed within the turbine housing. The turbine housing is attached to one end of a shaft. The turbocharger includes a center housing that is connected to one end of the turbine housing, and is configured to carry the shaft therein. A compressor housing is attached to a portion of the center housing opposite from the turbine housing.

Turbochargers of this invention comprise a compressor that is rotatably disposed within the compressor housing. The compressor is attached to the shaft and comprises two impellers that are placed in back-to-back orientation with one another. The compressor can comprise impellers that are integral or separate from one another. The compressor housing includes at least one air inlet for directing inlet air into the compressor housing and to the compressor impellers.

The turbocharger further comprises means for controlling the flow of air within the compressor housing. In an example embodiment, such means is in the form of a movable member that is positioned downstream from the compressor and that is configured to block the passage of pressurized air produced by one of the compressor impellers when actuated. In a preferred embodiment, the movable member is annular and is disposed within a compressor housing wall cavity and is designed to project from the cavity a desired amount to impair the passage of pressurized air. The movable member is used to regulate the amount of pressurized air exiting the compressor housing for the purpose of providing enhanced compressor operating efficiency throughout the operating range and mass flow requirements of the engine.

BRIEF DESCRIPTION OF THE DRAWINGS

The invention will be more clearly understood with reference to the following drawings wherein.

DETAILED DESCRIPTION

Turbochargers of this invention generally comprise dual compressors arranged in a back-to-back configuration that are specifically designed to provide an improved degree of turbine matching to improve compressor and turbine efficiency, and to produce a desired air mass flow rate to the engine while also meeting engine emission requirements. These turbochargers include a compressor housing and surrounding architecture that is specifically constructed to accommodate the dual compressors therein, and are designed to facilitate air inlet flow to both compressors in a manner that is ideally balanced. These turbochargers may further include means for regulating the amount of pressurized air exiting the compressor housing for the purpose of providing an expanded compressor operating envelope, and enhanced compressor operating efficiency throughout the operating range and mass flow requirements of the engine.

Figure 1:
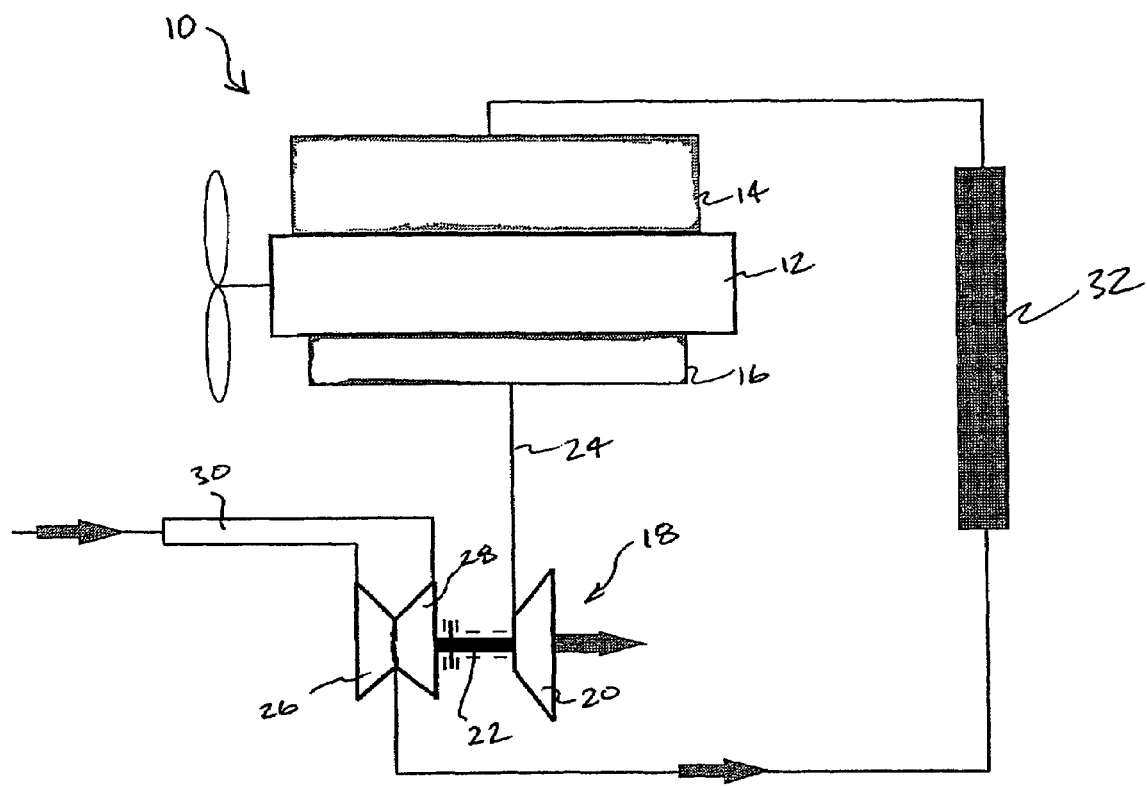
FIG. 1 illustrates a schematic diagram of an embodiment of a turbocharger constructed according to principles of this invention as used within an internal combustion engine.

FIG. 1 schematically illustrates a turbocharged internal combustion engine system 10 comprising an internal combustion engine 12, which can be a gasoline or diesel engine, having an air intake manifold 14 and an exhaust gas manifold 16 attached thereto. A turbocharger 18 of this invention is mounted near the engine 12 and includes a turbine housing that comprises a turbine wheel or turbine 20 disposed therein, that is mounted to a shaft 22 disposed within a center housing that is mounted to the turbine housing. The turbine wheel 20 receives exhaust gas from the engine via suitable connection means 24, connecting the exhaust manifold to the turbine housing.

The turbocharger 18 comprises a compressor housing that is attached to an opposite axial end of the center housing, and that includes dual compressor impellers or compressors 26 and 28 rotatably disposed therein. The compressors are placed in a back-to-back orientation and are both connected to the shaft 22 for rotary activation by the turbine 20. The compressor housing is specifically constructed having an air inlet 30 that is configured to direct air to each of the compressors 26 and 28. As explained in greater detail below, the air inlet may be configured a variety of different ways depending on the particular application and design parameters/objectives. Also, as better explained below, the compressors are specially sized and configured to provide improved turbine matching, when compared to conventional single compressor turbochargers, to produce both an improved compressor efficiency and desired improvement in BMEP.

A cooler 32, e.g., an air-to-air charge cooler, can be used to reduce the temperature of pressurized air leaving the compressor housing, and is interposed between the compressor housing and the engine intake manifold.

The particular system described and illustrated above is provided for the purpose of referencing a turbocharger as constructed according to this invention in its most elementary form. If desired, other devices can be used with the turbocharger of this invention to achieve desired changes in turbocharger performance. For example, air or gas flow controlling means can be can be used in association with turbochargers of this invention to achieve control over the flow of air to or from the turbocharger. Such means can be part of the turbocharger itself, or can be separate from the turbocharger. Also, it is understood that turbochargers of this invention can be configured having one or more variable geometry members used in association with the turbine, to control the amount of exhaust gas being directed to the turbine wheel, or used in association with the compressor, to control the amount of pressurized gas exiting the compressor housing.

Figure 2:
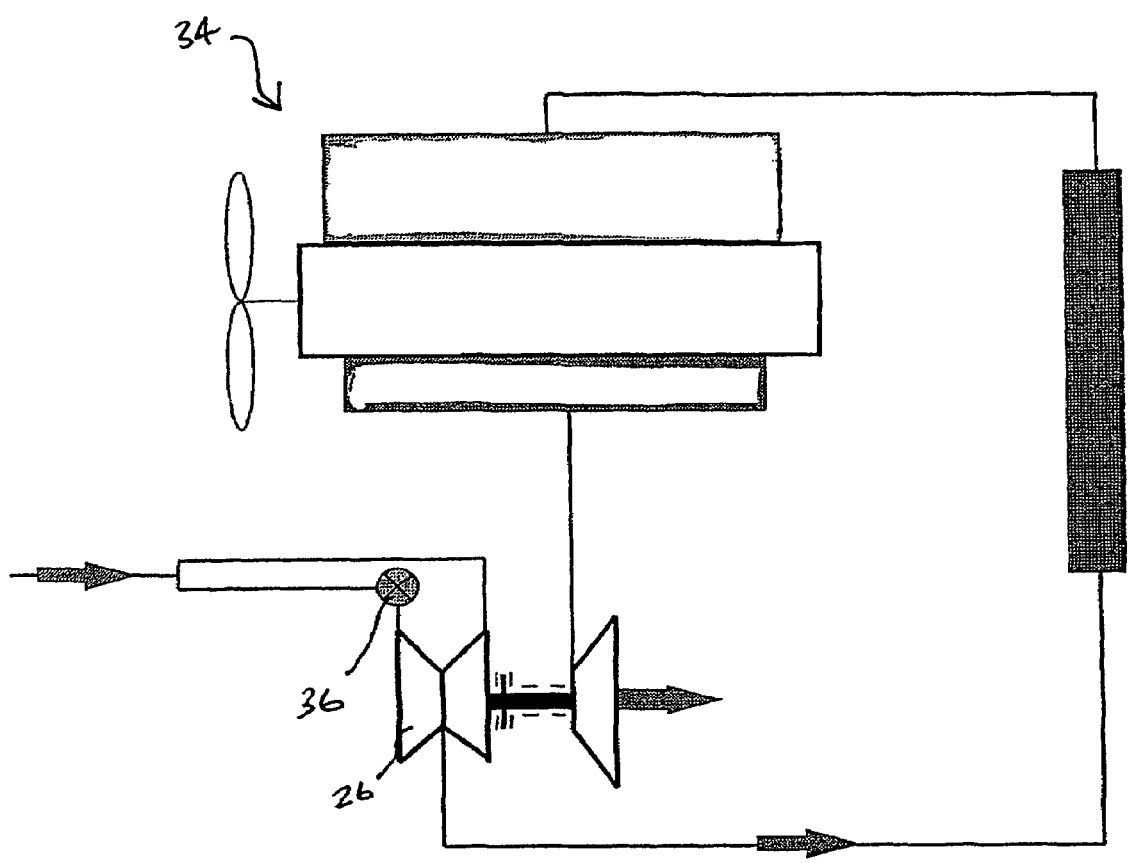
FIG. 2 illustrates a schematic diagram of another embodiment of a turbocharger constructed according to principles of this invention as used within an internal combustion engine.

FIG. 2 schematically illustrates a turbocharged internal combustion engine system 34 comprising the same general components noted above and illustrated in FIG. 1. In addition, this system 34 includes a flow controlling means 36 that is positioned upstream from one of the compressors 26. Such flow controlling means can be positioned within or outside of the compressor housing, and can be actuated by an engine controller or other means to control the amount of inlet air directed to the compressor depending on the particular operating condition of the engine to control the onset of surge flow, thereby providing most efficient compressor operation that meets the particular engine mass flow requirements.

Figure 3:
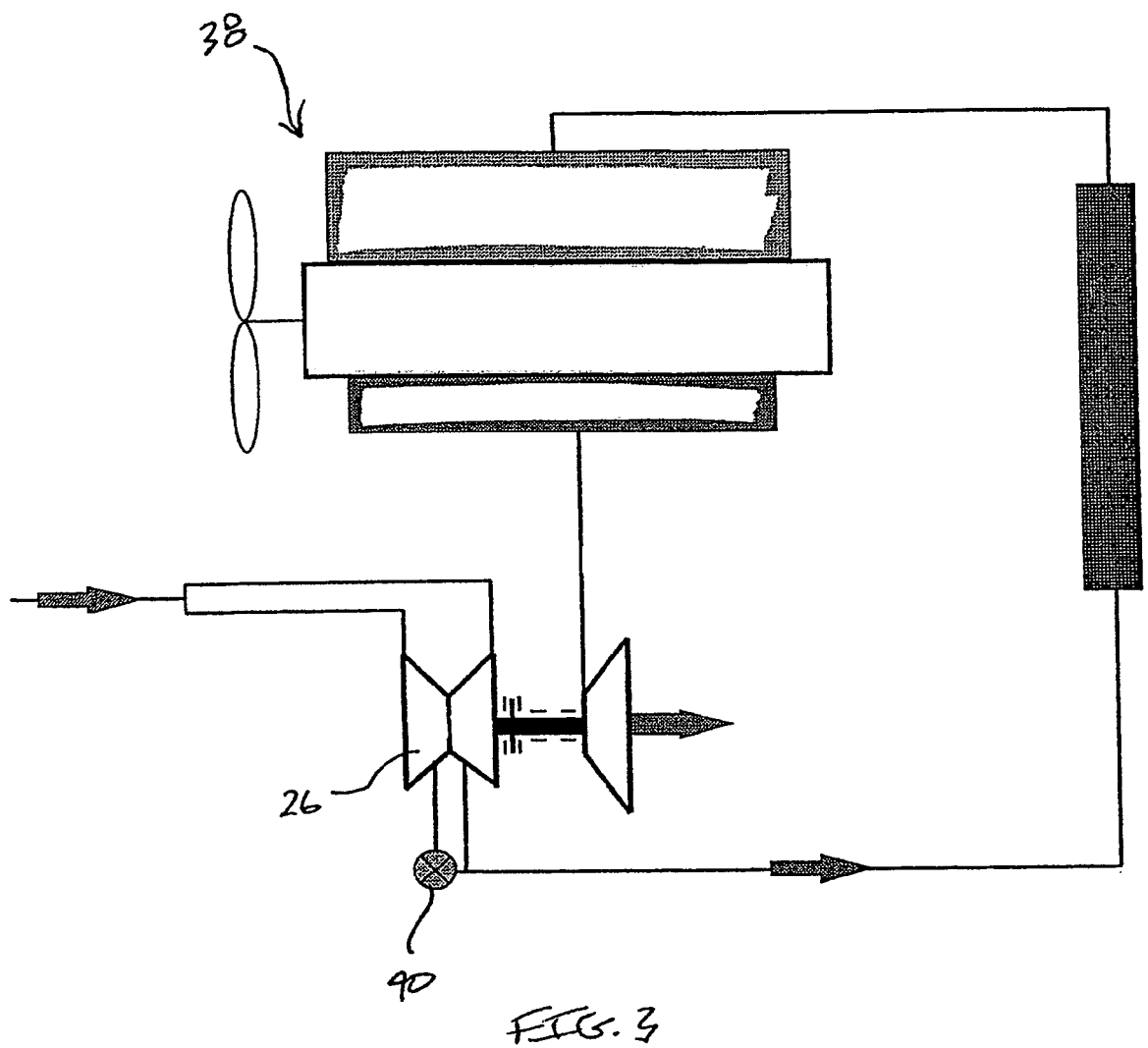
FIG. 3 illustrates a schematic diagram of another embodiment of a turbocharger constructed according to principles of this invention as used within an internal combustion engine.

FIG. 3 schematically illustrates a turbocharged internal combustion engine system 38 comprising the same general components noted above and illustrated in FIG. 1. In addition, this system 38 includes a flow controlling means 40 that is positioned downstream from one of the compressors 26. Such flow controlling means can be positioned within or outside of the compressor housing, and can be actuated by an engine controller or other means to control the amount of inlet air directed to the compressor depending on the particular operating condition of the engine to control the onset of surge flow, thereby providing most efficient compressor operation that meets the particular engine mass flow requirements.

Figure 4:
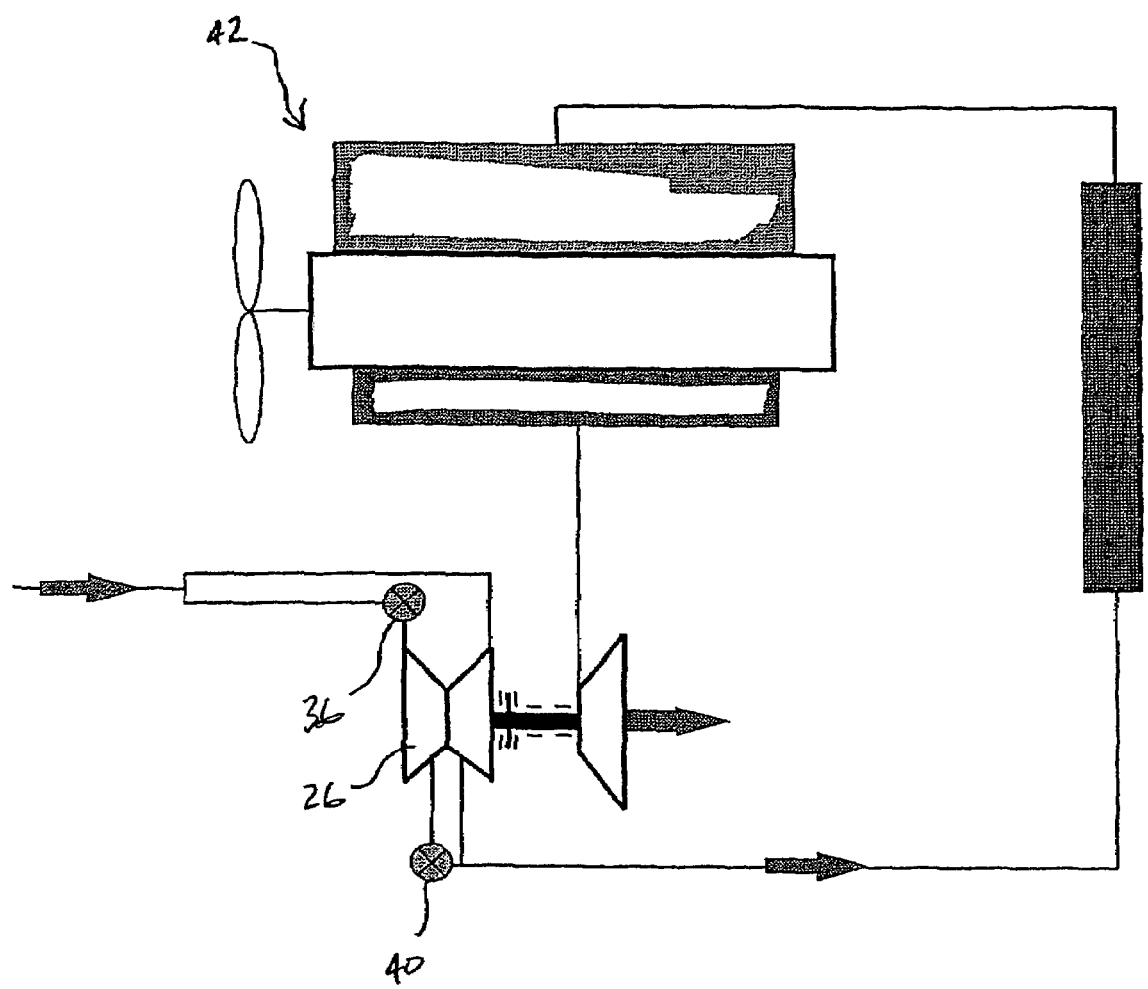
FIG. 4 illustrates a schematic diagram of another embodiment of a turbocharger constructed according to principles of this invention as used within an internal combustion engine.

FIG. 4 schematically illustrates a turbocharged internal combustion engine system 42 comprising the same general components noted above and illustrated in FIG. 1. In addition, this system 42 includes both the flow controlling means 36 illustrated in FIG. 2, that is positioned upstream from one of the compressors 26, and the flow controlling means 40 illustrated in FIG. 3, that is positioned downstream from one of the compressors 26. Again, these flow controlling means can be positioned within or outside of the compressor housing, and can be actuated by an engine controller or other means to control the amount of inlet air channeled to the compressor depending on the particular operating condition of the engine to control the onset of surge flow, thereby providing most efficient compressor operation that meets the particular engine mass flow requirements.

Figure 5:
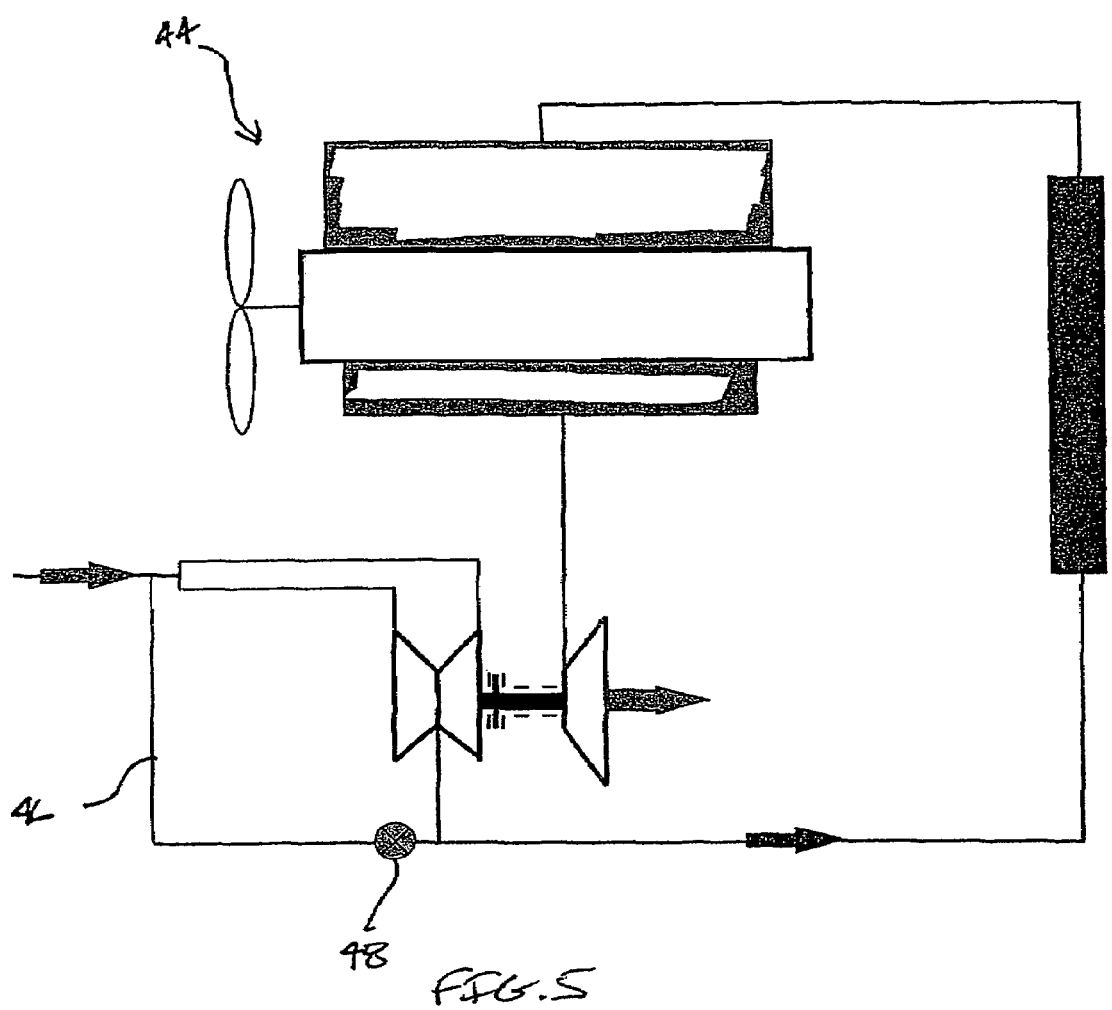
FIG. 5 illustrates a schematic diagram of another embodiment of a turbocharger constructed according to principles of this invention as used within an internal combustion engine.

FIG. 5 schematically illustrates a turbocharged internal combustion engine system 44 comprising the same general components noted above and illustrated in FIG. 1. In addition, this system 44 includes a bypass flow path 46 between the compressor outlet and inlet, and a flow controlling means 48 that is positioned within the bypass flow path. In this particular embodiment, a portion of the pressurized air produced in the compressor housing can be directed back to the compressor without cooling, e.g., is taken upstream of the cooler. The bypass flow path is provided to permit the routing and combining of pressurized air exiting the turbocharger with inlet air entering the compressor housing. The flow controlling means 48 can be positioned within or outside of the compressor housing, and can be actuated by an engine controller or other means to control the amount of pressurized air channeled to the compressor depending on the particular operating condition of the engine to increase compressor flow range, thereby providing most efficient compressor operation that meets the particular engine mass flow requirements.

Figure 6:
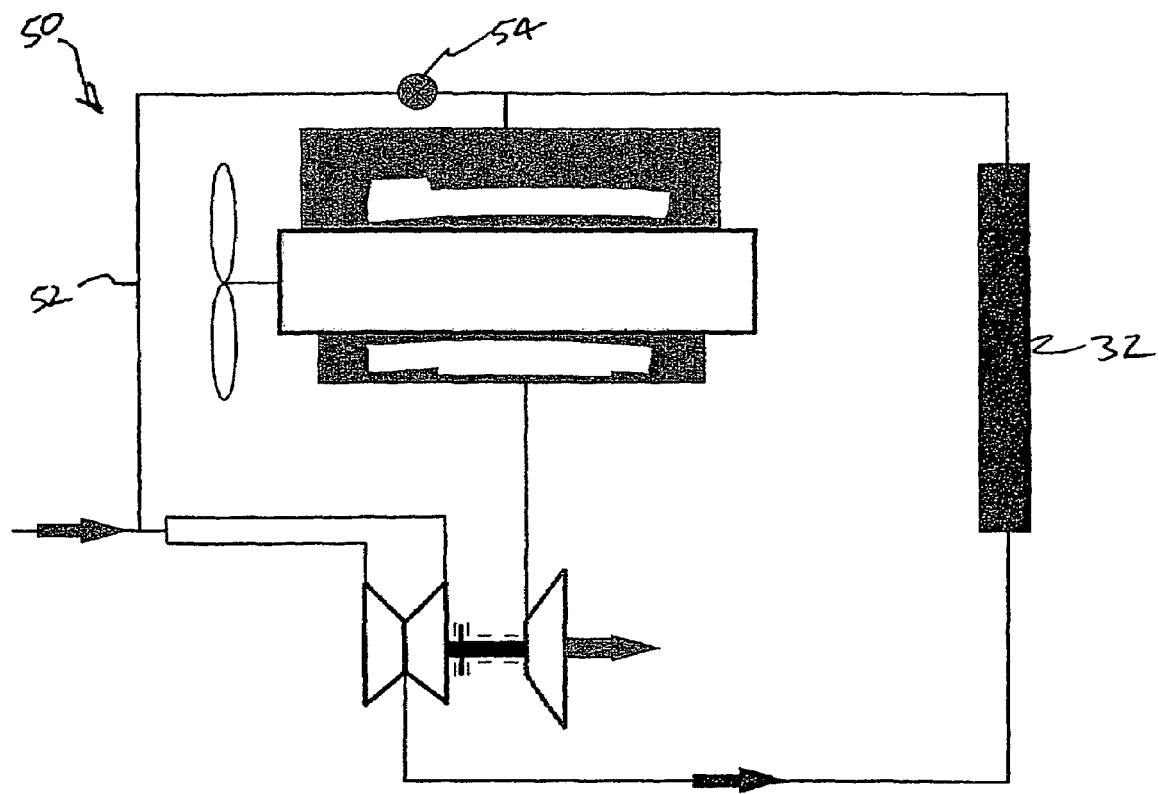
FIG. 6 illustrates a schematic diagram of another embodiment of a turbocharger constructed according to principles of this invention as used within an internal combustion engine.

FIG. 6 schematically illustrates a turbocharged internal combustion engine system 50 comprising the same general components noted above and illustrated in FIG. 1. In addition, this system 50 includes bypass flow path 52 between the charge cooler 32 and the compressor air inlet, and a flow controlling means 54 that is positioned within the bypass flow path. In this particular embodiment, the pressurized air is directed back to the compressor after it is cooled, e.g., is taken downstream of the cooler 32. The bypass flow path is provided to permit the routing and combining of pressurized air exiting the turbocharger with inlet air entering the compressor housing. The flow controlling means 54 is positioned outside of the compressor housing, and can be actuated by an engine controller or other means to control the amount of cooled pressurized air channeled to the compressor depending on the particular operating condition of the engine to increase compressor flow range, thereby providing most efficient compressor operation that meets the particular engine mass flow requirements.

Figure 7:
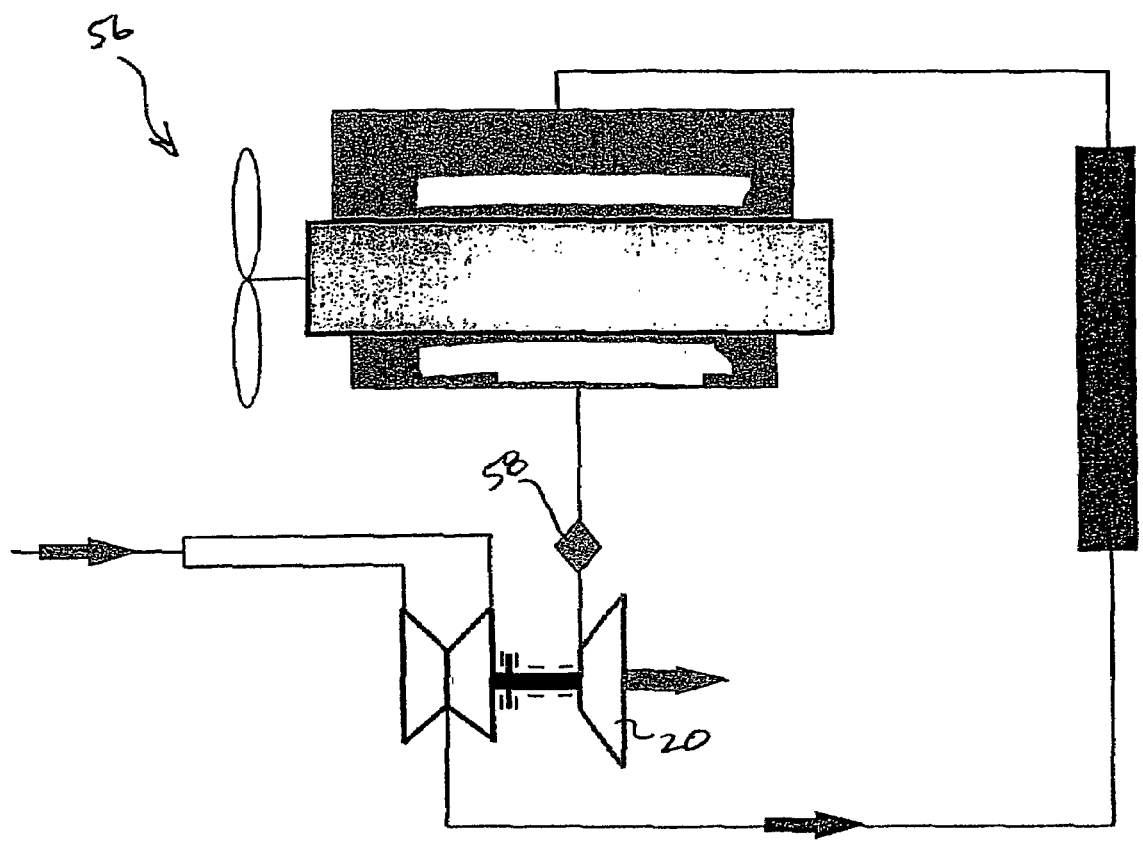
FIG. 7 illustrates a schematic diagram of another embodiment of a turbocharger constructed according to principles of this invention as used within an internal combustion engine.

FIG. 7 schematically illustrates a turbocharged internal combustion engine system 56 comprising the same general components noted above and illustrated in FIG. 1. In addition, this system 56 includes a flow controlling means 58 that is positioned upstream from the turbine wheel 20. Such flow controlling means can be positioned within or outside of the turbine housing. For example, the flow controlling means 58 can be in the form of one or more variable geometry members that are positioned within the turbocharger such as those disclosed in U.S. Pat. No. 6,269,642, which are each hereby incorporated herein by reference. The flow controlling means can be actuated by an engine controller or other means to control the amount of exhaust gas directed to turbine wheel depending on the particular operating condition of the engine. Together, the dual compressors and variable geometry turbine members operate to provide efficient turbocharger operation that meets the particular engine mass flow requirements.

Figure 8:
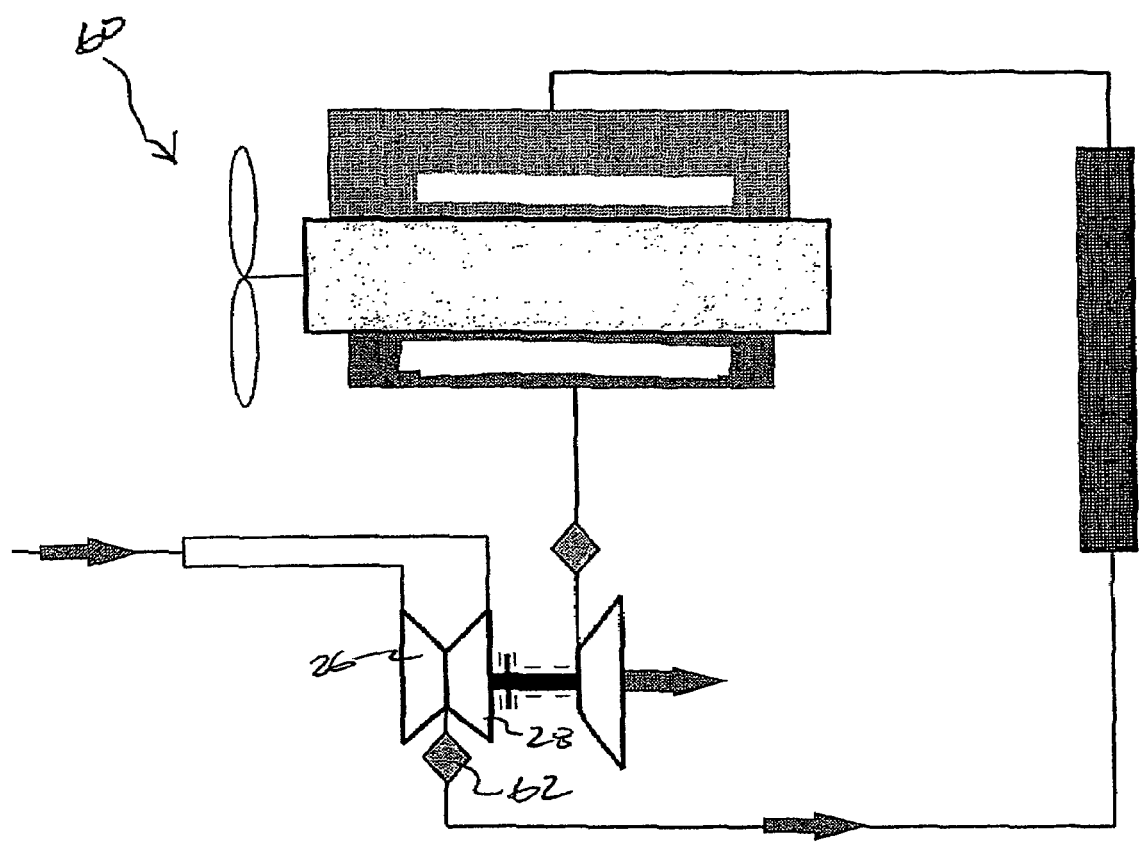
FIG. 8 illustrates a schematic diagram of another embodiment of a turbocharger constructed according to principles of this invention as used within an internal combustion engine.

FIG. 8 schematically illustrates a turbocharged internal combustion engine system 60 comprising the same general components noted above and illustrated in FIGS. 1 and 8. In addition, this system 60 includes a flow controlling means 62 that is positioned downstream from the compressors 26 and 28. Such flow controlling means 62 can be positioned within or outside of the compressor housing. For example, the flow controlling means 62 can be in the form of one or more variable geometry members that are positioned within the turbocharger. The flow controlling means 62 can be actuated by an engine controller or other means to control the amount of pressurized air that is passed out of the compressor housing depending on the particular operating condition of the engine. Together, the dual compressors, variable geometry compressor members and variable geometry turbine members operate to provide efficient turbocharger operation that meets the particular engine mass flow requirements.

Figure 9:
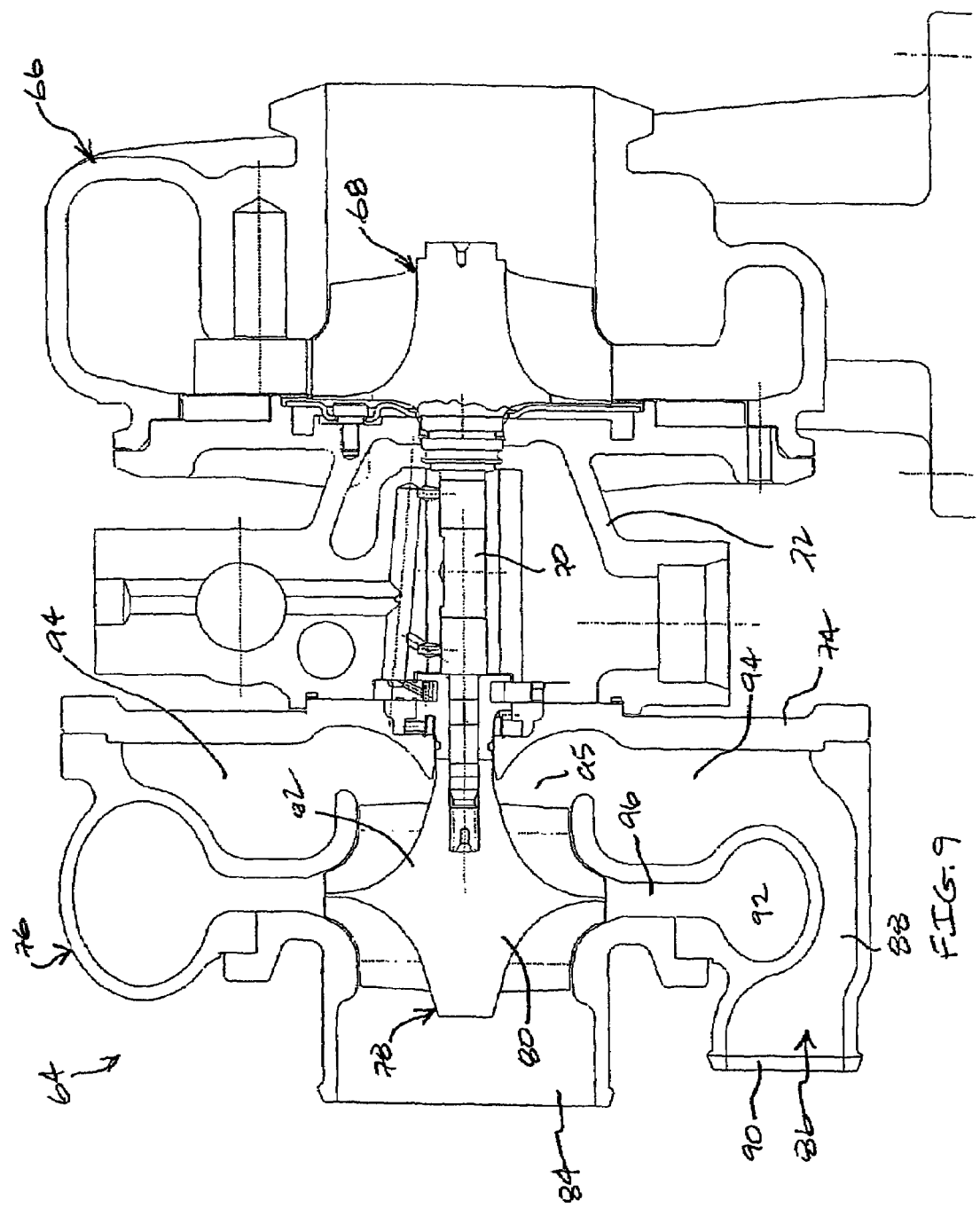
FIG. 9 illustrates a schematic side view of an embodiment of a turbocharger of this invention comprising separate axially positioned air inlets.

FIG. 9 illustrates an embodiment of a turbocharger 64 of this invention comprising, moving from right to left, a turbocharger housing 66 comprising a turbine wheel or turbine 68 rotatably disposed therein and mounted to an end of a shaft 70 that is disposed through a center housing 72. A backing plate 74 is interposed between the center housing 72 and a compressor housing 76. A dual compressor 78 is rotatably disposed within the compressor housing, is mounted to an opposite end of the shaft 70, and is configured having a back-to-back oriented impeller faces 80 and 82. The compressor 78, for this and all turbocharger embodiments of the invention, can be configured so that the shaft 70 extends completely or only partially therethrough. Additionally, the compressor can be configured in the form of a single part, e.g., as illustrated, or may comprise an assembly or more than one part The compressor housing 76 is specially configured to permit both the passage of inlet air to each compressor, and the passage of pressurized gas from each compressor. In this particular embodiment, the compressor housing comprises two separate axially positioned air inlets; namely, a first air inlet passage 84, that is positioned adjacent an end of the compressor housing to pass inlet air in an axial direction to the compressor face 80, and a second air inlet passage 86 that is separate from and positioned a distance radially away from the first air inlet 84. The second air inlet 86 includes a first section 88, that extends a distance axially from an inlet opening go into the compressor housing and that is defined between an outside surface of a volute 92 and an inside wall surface of the compressor housing, and a second section 94, that extends circularly around the compressor housing and projects radially inwardly. The second section 94 is defined by an outside surface of the volute 92 and an inside surface of the backing plate 74. Inlet air passing through the second section is delivered to the compressor second face 82 via an opening 95 formed between the volute outer wall surface and the backing plate. Pressurized air that is provided by the compressor 78 is directed radially from each of the faces 8o and 82 through a single passage 96 and to the volute 92.

Figure 10:
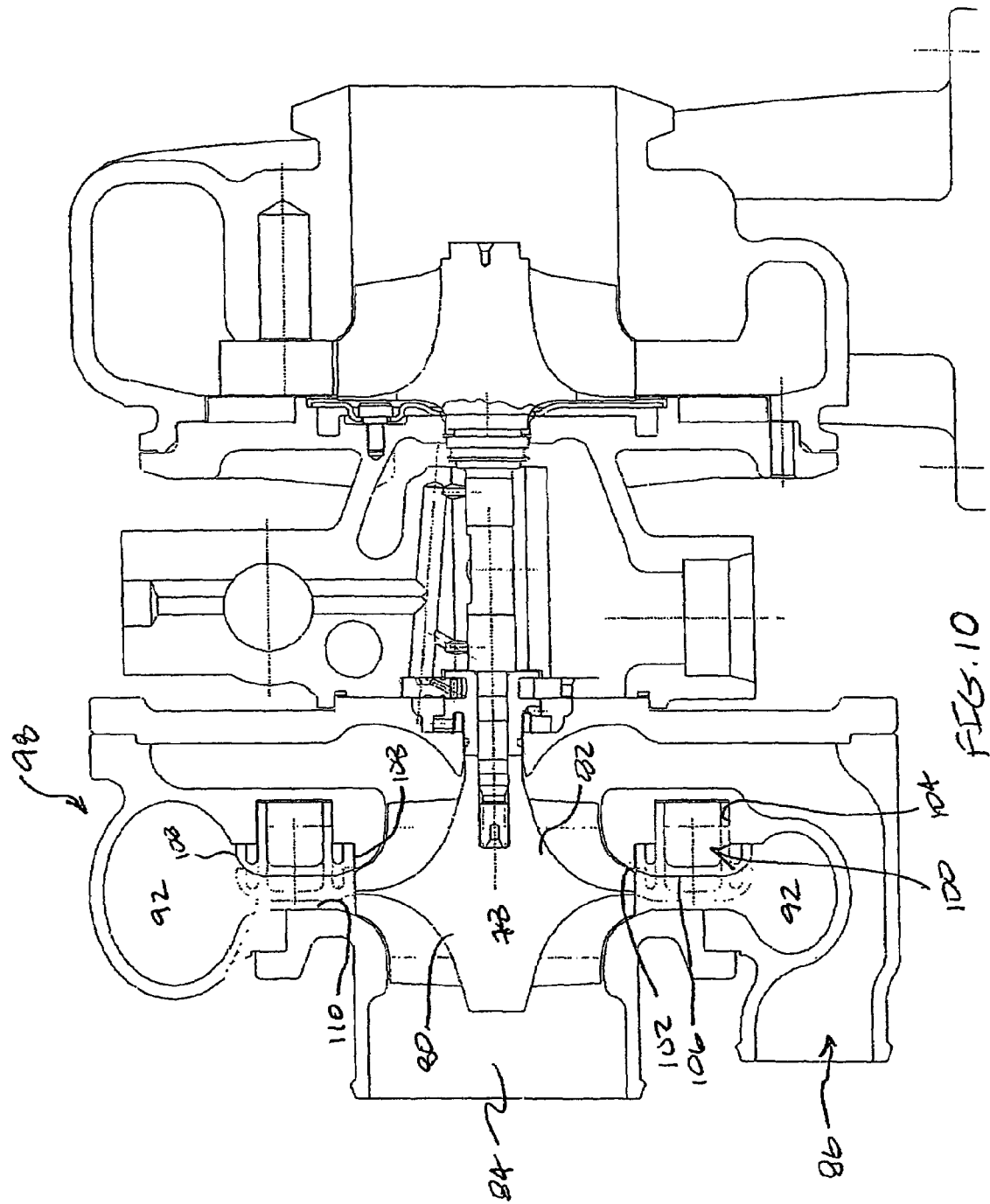
FIG. 10 illustrates a schematic side view of another embodiment of a turbocharger of this invention comprising separate axially positioned air inlets and an air flow control means.

FIG. 10 illustrates an embodiment of a turbocharger 98 of this invention comprising the same general turbine housing and center housing components noted above for the embodiment illustrated in FIG. 9. This particular embodiment includes a compressor housing that comprises the same first and second air inlets 84 and 86 as noted above, configured to deliver air to the compressor first and second impeller faces. The compressor housing also includes a flow controlling means 100 disposed therein for controlling the amount of pressurized air passed from the compressor 78 to the volute 92.

In this embodiment, the flow controlling means 100 is provided in the form of an annular member that is movably positioned within a section of an inner nozzle wall 102 interposed between the compressor and the volute. The annular member 100 is positioned within a cavity 104 that is sized and shaped to accommodate placement of a portion of the member therein. The annular member 100 preferably has an outside surface 106 that is configured to compliment the immediately adjacent sections of the inner nozzle wall to minimize any unwanted aerodynamic effects.

In this particular embodiment, the annular member 112 has a mushroom-shaped profile with rounded end sections that are configured to minimize the transition of pressurized air moving from the compressor to the volute, thereby operating to minimize unwanted aerodynamic effects within the compressor housing.

The annular member 100 is shown in both a unactuated and an actuated position (in phantom). In an unactuated position, the annular member does not project towards an outer nozzle wall 110 to restrict the passage of pressurized air from the compressor. In an actuated position, the annular member projects a defined distance towards the outer nozzle wall to restrict the passage of pressurized air produced by the compressor second face 82 into the single passage 96. The annular member can be actuated by mechanical, hydraulic, pneumatic or electronic means to project in the manner described. The extent to which the annular member projects towards the inner nozzle wall is controlled by a suitable limiting means.

Configured in this manner, the annular member 100 can be operated, by engine control unit or the like, to control the amount of pressurized air being produced by the compressor to increase the flow range of the compressor, thereby maximizing compressor efficiency to provide the desired BMEP to meet the engine's mass flow requirements.

Figure 11:
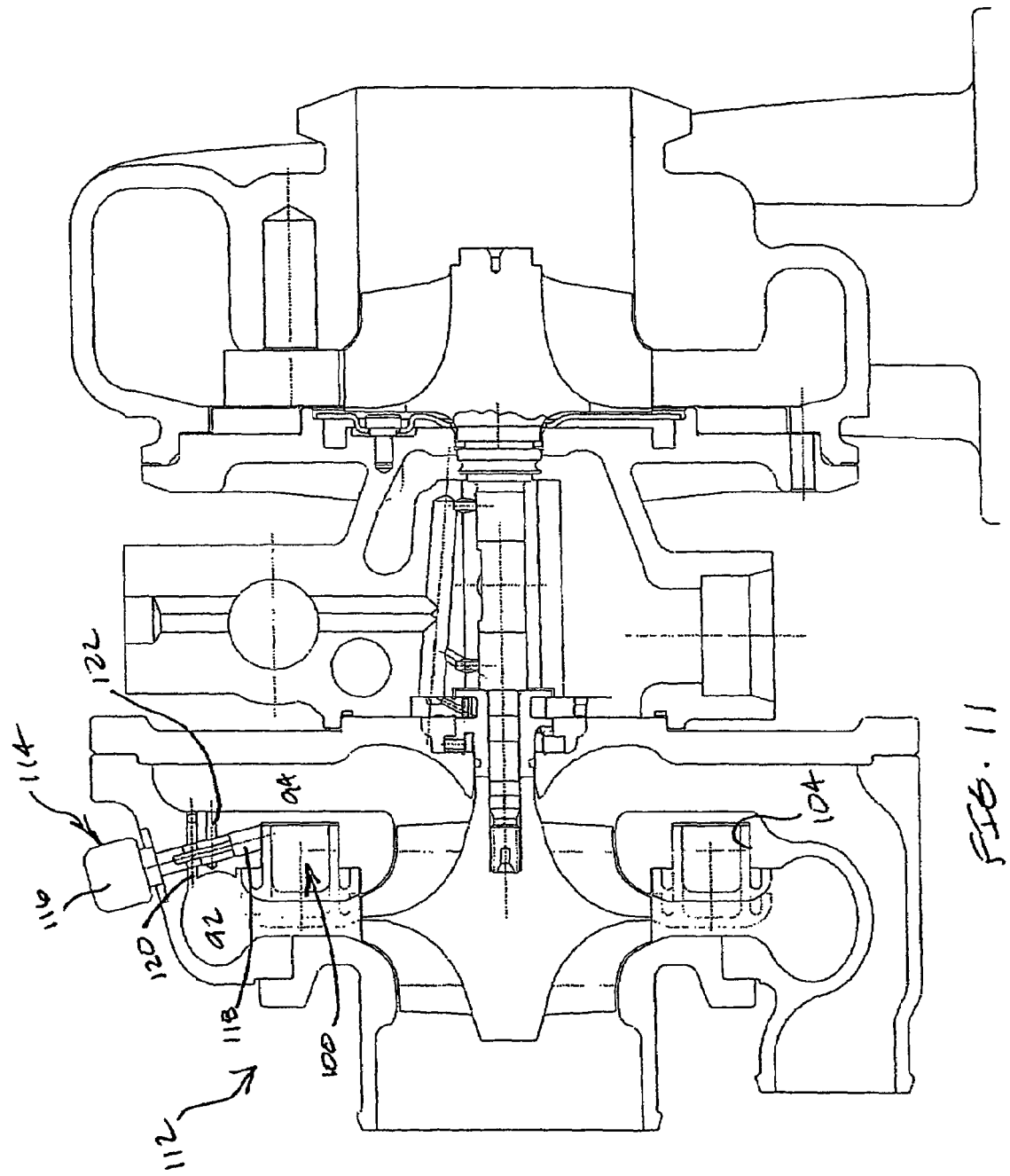
FIG. 11 illustrates a schematic side view of another embodiment of a turbocharger of this invention comprising separate axially positioned air inlets, an air flow control means, and a actuation means.

FIG. 11 illustrates an embodiment of a turbocharger 112 of this invention comprising the same general components noted above for the embodiment illustrated in FIG. 10. This embodiment additionally includes means 114 for actuating the annular member 100. The actuating means 114 is in the form of a two-way valve that is configured to be moved to provide air-flow communication between a back side of the annular member, e.g., between the annular member and the cavity, and the volute 92, or to provide an air-flow communication between a back side of the annular member and the second air passage 94. In an example embodiment, the valve 116 extends within a valve port 118 that is in air flow communication with the cavity 104. The valve port 118 is also in air flow communication with a the second air passage 94 and the volute 92. This can be accomplished via one or two different ports. In the example shown, a first port 120 connects the volute 92 to the valve port, and a second port 122 connects the second air passage 94 valve port.

The valve 116 is configured to permit the passage of air therethrough from the volute to the cavity 104 when placed in one rotational position within the valve port, thereby causing the annular member to move into an actuated position, and is configured to permit the passage of air from the second air passage to the cavity when placed in a second rotational position, thereby causing the annular member to move into a unactuated position. Configured in this manner, the valve can be operated, e.g., by pneumatic, hydraulic, mechanical or electrical means, to actuate the annular member.

Figure 12:
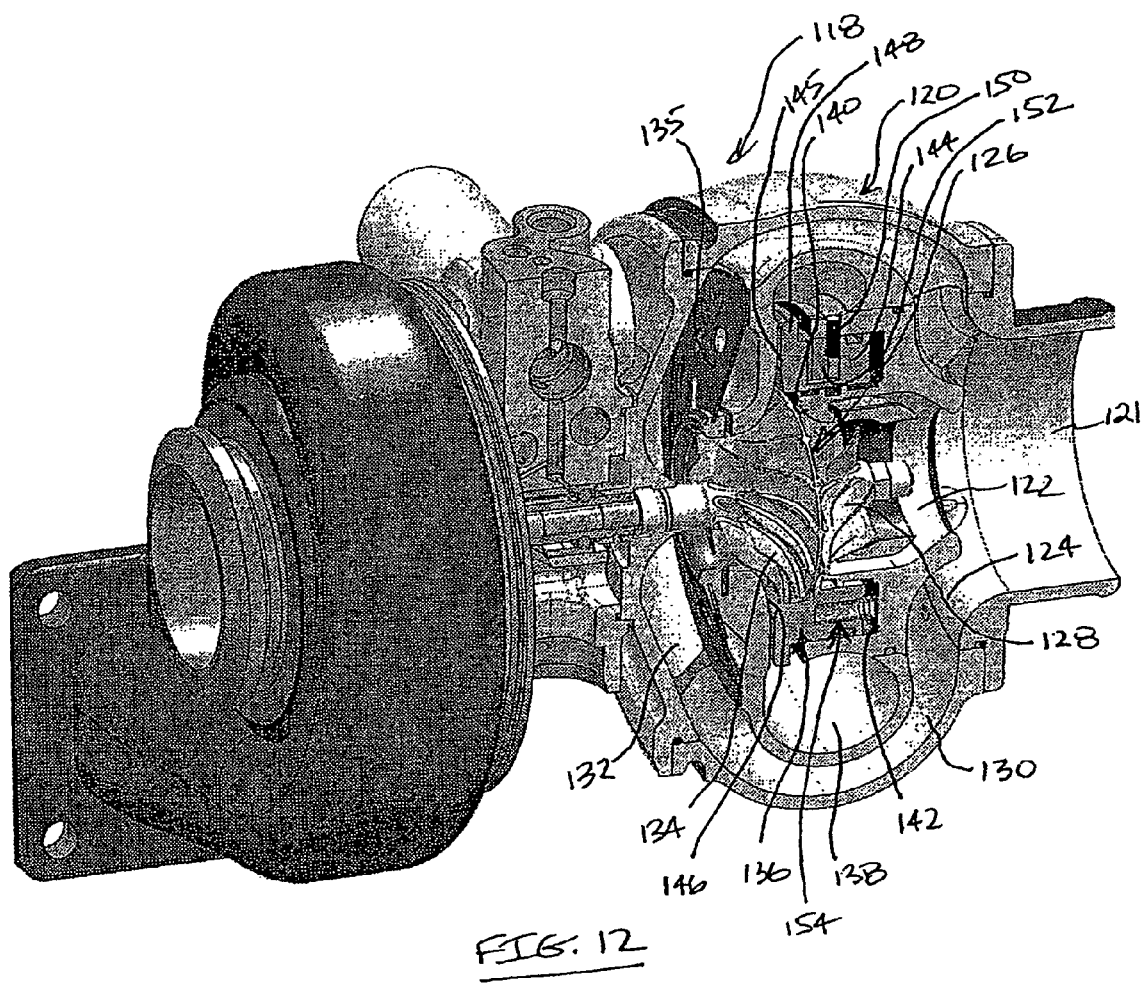
FIG. 12 illustrates a schematic side view of another embodiment of a turbocharger of this invention comprising concentric axially positioned air inlets and an air flow control means.

FIG. 12 illustrates an embodiment of a turbocharger 118 of this invention comprising the same general turbine housing and center housing components noted above for the embodiment illustrated in FIG. 9. This particular embodiment includes a compressor housing 120 having a single or common air inlet 121 comprising concentrically arranged first and second air passages 122 and 124. The air inlet 121 is positioned axially adjacent the compressor 126. The first air passage 122 is positioned axially inwardly a distance towards the compressor and is configured to deliver air to the compressor first face 128. The second air passage 124 is positioned concentrically around the first air passage 122, and includes first and second sections 130 and 132 that are similar in design to those described above for the embodiment of FIG. 9 and that are configured to deliver air to the compressor second face 134. If desired, a diffuser 135 can be positioned within the second section 132 to provide desired air treatment upstream of the compressor.

The compressor housing 120 further comprises a flow controlling means 136 disposed therein for controlling the amount of pressurized air passed from the compressor 126 to the volute 138. In this embodiment, the flow controlling means 136 is provided in the form of an annular member that is movably positioned within a section of an outer nozzle wall 140 interposed between the compressor and the volute. In an example embodiment, the section of the outer nozzle wall incorporating the annular member can be a separate piece of the compressor housing. The annular member 136 is positioned within a cavity 142 that is sized and shaped to accommodate placement of a base portion 144 of the member therein. The member 136 preferably has an outside surface 145 configured to compliment the immediately adjacent sections of the outer nozzle wall 140, the volute 138, and the opposite inner nozzle wall 146 to minimize unwanted aerodynamic effects.

In an example embodiment, the annular member 136 includes a head section along one of its axial ends that is disposed outside of the cavity. The head includes a lip 148 that projects radially outwardly therefrom and that is sized and shaped to forms an edge potion of the volute. The lip operates to smoothen the transition of pressurized air moving from the compressor to the volute, thereby operating to minimize unwanted aerodynamic effects within the compressor housing.

The annular member 136 is shown in FIG. 12 in an actuated position, projecting outwardly towards the inner nozzle wall 146 a desired distance to restrict the passage of pressurized air from the compressor. In an example embodiment, the annular member projects a defined distance towards the inner nozzle wall to restrict the passage of pressurized air produced by the compressor first face 128. The annular member can be actuated by mechanical, hydraulic, pneumatic or electronic means to project in the manner described. The extent that the annular member projects towards the inner nozzle wall is controlled by a suitable limiting means. In an example embodiment, the limiting means is provided by a pair of cooperative members in the cavity and on the member. In an example embodiment, the limiting means can be a tongue and groove mechanism. In one preferred embodiment, a tongue 150 projects within the cavity that is sized and shaped to register within a groove 152 provided in the annual member. This is but one arrangement of cooperative members, and it is understood than many others are within the scope and spirit of this invention.

Configured in this manner, the annular member 136 can be operated, by engine control unit or the like, to control the amount of pressurized air being produced by the compressor to maximize improve compressor flow, thereby providing improved compressor efficiency to provide the desired BMEP to meet the engine's mass flow requirements.

The invention embodiment illustrated in FIG. 12 includes a biasing mechanism 154 for biasing the annular member 136 in a particular position within the cavity 142. In a preferred embodiment, the biasing mechanism 136 can be in the form of one or more springs 156 that are interposed between the annular member 136 and the cavity 142 to cause the annular member to be biased outwardly from the cavity towards the nozzle inner wall 146. In a preferred embodiment, the annular member comprises a number of springs that are positioned equidistantly therearound to provide a desired biasing effect within the turbocharger.

As illustrated, when biased in this position, the annular member operates to impair the passage of pressurized air produced by the compressor first face 128 into the volute 138. Once the pressure that is produce by the compressor 126 reaches a threshold amount, it operates to offset the force provided by the spring and causes the annular member to move into the cavity, thereby operating to restore passage of pressurized air from the compressor first face.

Figure 13:
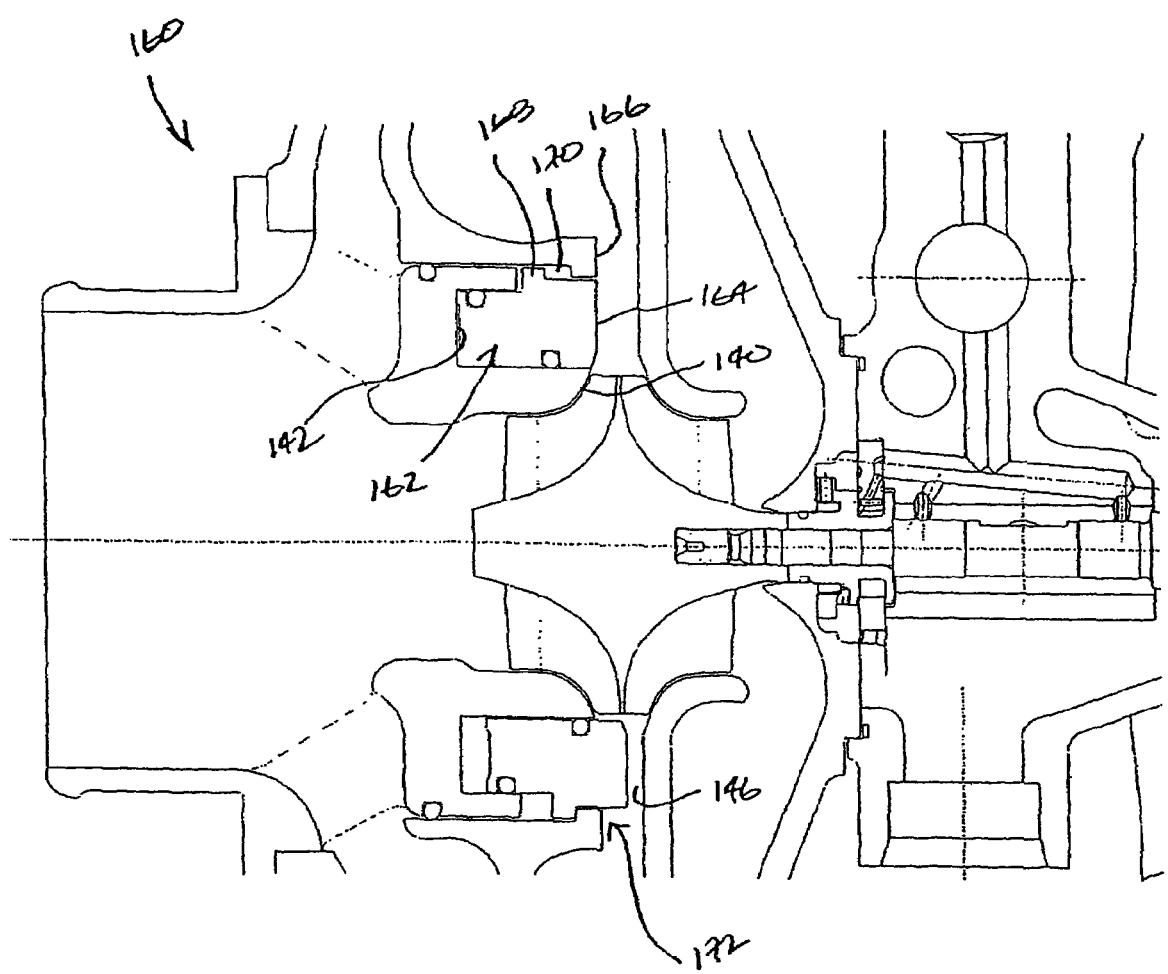
FIG. 13 illustrates a cross-sectional side view of another embodiment of a turbocharger of this invention having concentric axially positioned air inlets and air flow control means.

FIG. 13 illustrates an embodiment of a turbocharger 16o of this invention comprising the same general components noted above for the embodiment illustrated in FIG. 12. This particular embodiment comprises an annular member 162 that is different from that disclosed and illustrated in FIG. 12 in that it does not include a head portion having a lip that forms part of the volute. Rather, it includes a head portion with a surface with edge portions that are shaped to blend with adjacent surface features of the outer nozzle wall 140 and a volute lip 166. Additionally, the annular member limiting means of this embodiment is different in that the annular member is configured having a pin 168 that cooperates within a slot 170 formed in a wall portion of the cavity 142.

For purposes of reference and explanation, in FIG. 13, the annular member 162 is shown in the actuated and unactuated position. It is to be understood that there is only one annular member within the compressor housing, and that it will be actuated or unactuated position, but not both. When placed in the actuated position 172, the engagement of the pin 168 against a wall of the slot 170 operates to limit outward travel of the annular member, thereby permitting the annular member to project a desired distance towards the inner nozzle wall to impair the passage of pressurized air from the compressor first face 128 to the volute 138.

Figure 14:
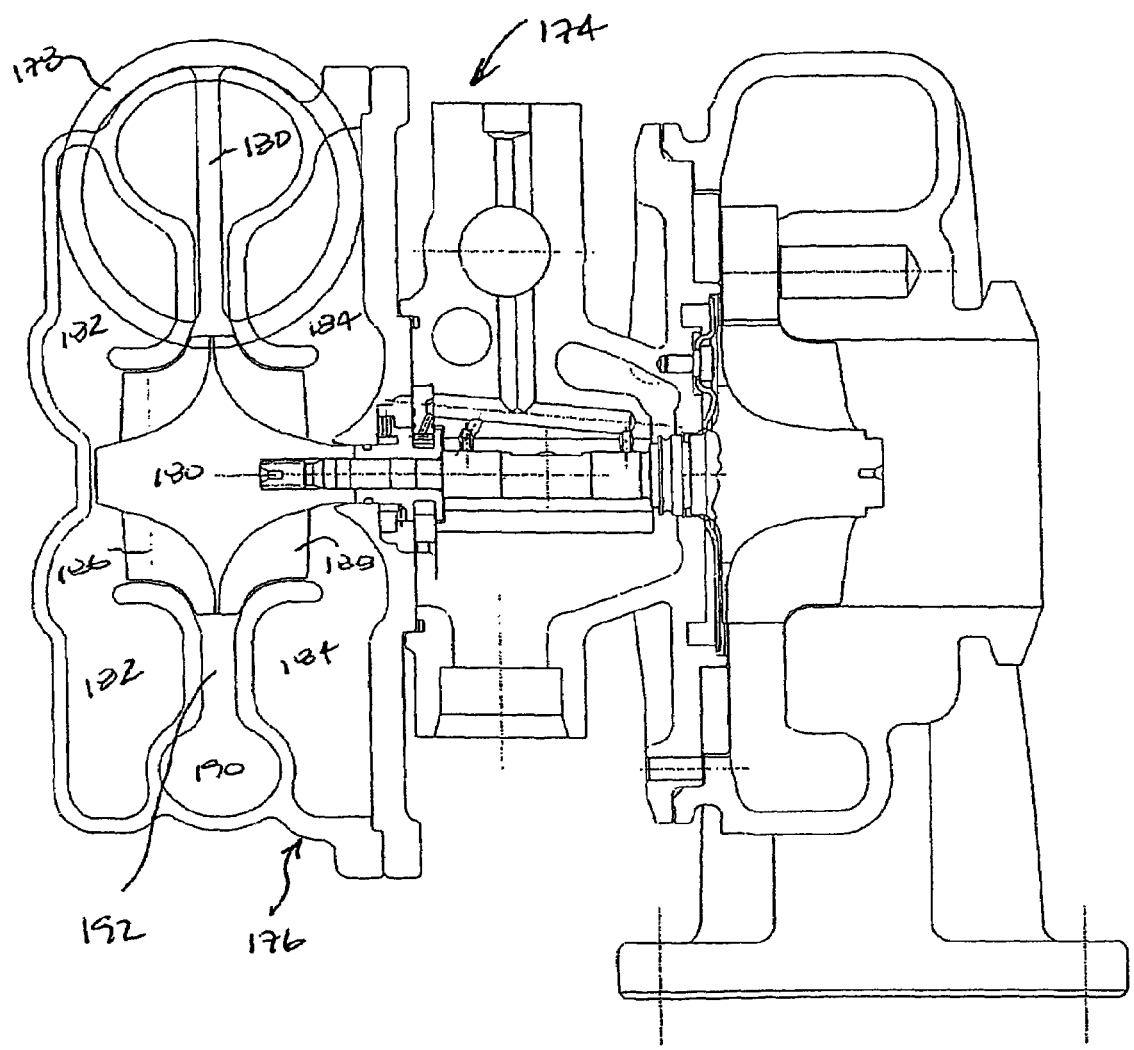
FIG. 14 illustrates a cross-sectional side view of another embodiment of a turbocharger of this invention comprising a single radial air inlet.

FIG. 14 illustrates another embodiment of a turbocharger 174 of this invention comprising the same general turbine housing and center housing components noted for the earlier-described and illustrated embodiments. This particular embodiment comprises a compressor housing 176 comprising a single air inlet 178 that is positioned to introduce inlet air radially relative to the compressor 180. The air inlet 178 includes a partition 180 for separating the entering air into two different air flow passages 182 and 184 that each extend in a circular manner around the compressor to deliver air to respective compressor faces 186 and 188. In an example embodiment, the two air flow passages are configured as being substantially symmetric to one another. Pressurized air moves from the compressor first and second faces 186 and 188 to a volute 190 via a common passage 192. Configured in this manner, the compressor housing provides inlet air in substantially the same condition to both compressor faces to assure compressor performance.

Figure 15:
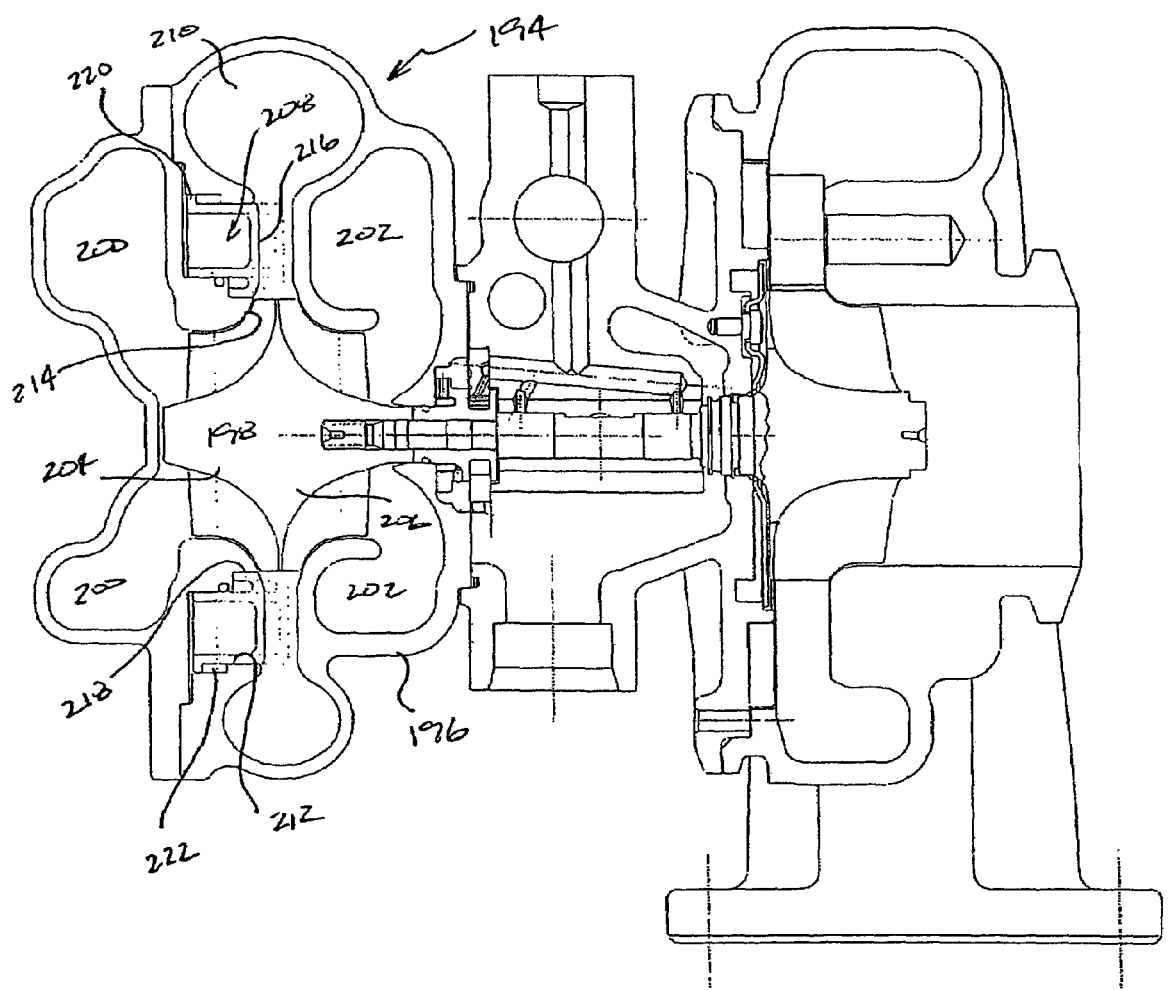
FIG. 15 illustrates a cross-sectional side view of another embodiment of a turbocharger of this invention comprising having dual radial air inlets and air flow control means.

FIG. 15 illustrates another embodiment of a turbocharger 194 of this invention comprising the same general turbine housing and center housing components noted for the earlier-described and illustrated embodiments. This particular embodiment comprises a compressor housing 196 having one or more air inlet (not shown) that is positioned to introduce inlet air radially relative to the compressor 198. The air inlet is directed into two different air flow passages 200 and 202 that each extend in a circular manner around the compressor to deliver air to respective compressor faces 204 and 206. The air flow passages are designed having substantially the same configuration in a stacked orientation, i.e., they are not symmetric with one another, to provide inlet air to each of the respective compressor faces 204 and 206 in substantially the same condition.

The compressor housing 198 further includes an annular member 208 disposed therein to control the amount of pressurized air directed from the compressor to the volute 210. The annular member 208 is movably disposed within a cavity 212 of the outer nozzle wall 214. The annular member 208 includes a surface portion 216 that is configured to provide a smooth transition along the outer nozzle wall surface in an unactuated position. The annular member also includes a lip 218 that projects radially inwardly adjacent the surface portion 216 that operates to block off flow or pressurized air from the compressor first face 204 when projecting from the cavity in the actuated position.

The extent that the actuating member projects from the cavity is controlled by a limiting means, e.g., in the form of tongue-in-groove cooperating members. In this particular embodiment, the annular member includes a tongue 220 projecting from a base portion, and the cavity includes a groove 222 of determined axial length to accommodate a desired degree of axial annular member movement. The annular member can be actuated by the same techniques discussed above.

Turbochargers of this invention comprise a compressor that is sized and configured to provide an improved degree of turbine matching, when compared to conventional single compressor turbochargers, to produce the desired BMEP to meet engine mass flow requirements. A key feature of compressors used with this invention is that they are sized and configured to provide improved turbine speed matching. Conventional turbochargers having a single compressor force the turbine to operate too slowly, particularly in the low engine speed range. One solution would be to increase the speed of the compressor relative to the turbine. The aerodynamicist can raise the speed of the compressor by increasing the backward curvature of the exducer blading, or increasing the inducer area for a fixed compressor diameter. However, these choices will dramatically increase the aforementioned low cycle fatigue failures.

Compressors of this invention are designed having two impellers in a back-to-back arrangement. Using the same design scaled allows the diameter of the compressor to be reduced by a factor of approximately 0.7. The back-to-back compressors run at the same tip speeds as the single larger one, thus the stresses would be similar as would the aerodynamic performance. However, a benefit that is gained from this configuration is that the absolute rotational speed of the turbocharger is increased by ~40%, significantly improving the turbine match, even potentially allowing a reduction in the turbine diameter.

Being able to reduce the turbine diameter provides a reduced variable nozzle flow loss at engine acceleration conditions, as the smaller turbine can operate with the nozzle in a more open position at the same flow rate. The aerodynamicist now has the option of conducting an optimization of the turbine diameter, utilizing the exducer trim (the square of the ratio of exit diameter to the inlet diameter) and turbine blade exit angle against the nozzle loss. As the turbine diameter is decreased, the nozzle opening for a given low flow condition moves closer to the optimum nozzle setting (the combination of flow vector into the wheel and throat of the nozzle). Also, as the turbine diameter is decreased, the maximum turbine flow must be maintained which can be accomplished by a combination of turbine trim increase and blade wrap decrease (reducing the exit angle of the turbine wheel).

Turbochargers of this invention, are specifically engineered to address the compressor flow range noted above and provide surge line improvement as the viscous wall friction of the compressor has been reduced due to the elimination of one wall of the diffuser (when compared to two turbochargers wheels with hub and shroud walls on each diffuser). The hub line wall has been completely eliminated by this design. Turbochargers of this invention may further include flow controlling means that contribute further to surge line improvements. For example, using such flow controlling means to block the air flow through one of the compressors will operate to reduce the surge flow by one half.

Such flow controlling means can be operated, via suitable control means, to control the amount of pressurized air that is produced by the compressor throughout the engine operating range to ensure that the compressor is always operating within it flow range, thereby enabling to compressor to efficiently meet the engine's mass flow requirements.

Turbochargers, constructed according to the principals of this invention, may also provide an opportunity to downsize the turbocharger, perhaps reducing the weight by a factor of two, and the rotating inertia by a factor of eight. Turbocharger low speed response will be improved by increased compressor and turbine efficiencies, and reduced rotating group inertia. The optimum turbine performance will be moved to a significantly lower flow range, although the turbine maximum flow will be maintained. The compressor thrust loads will be balanced for most of the operating range. Heat losses to the under-hood environment will be reduced as well as the thermal inertia, significantly improving catalyst light-off time. Turbocharger packaging and manufacturing cost will be dramatically improved, particularly compared with multi-turbo configurations. Compressor flow range will no longer be a limiting factor to the engine low speed performance.

Having now described the invention in detail as required by the patent statutes, those skilled in the art will recognize modifications and substitutions to the specific embodiments disclosed herein. Such modifications are within the scope and intent of the present invention.

What is claimed is:

1. A compressor for a turbocharger comprising:
   a compressor wheel that comprises first and second compressor faces oriented back-to-back and a bore for mounting the compressor wheel to a shaft along a rotational axis of the compressor wheel; and
   a compressor housing that comprises
   a first passage to the first compressor face wherein a wall portion of the first passage comprises an annular, contoured surface to direct inlet air in a more axial direction toward an inducer portion of the first compressor face,
   a second passage to an inducer portion of the second compressor face,
   a bifurcated air inlet oriented to receive inlet air radially relative to the rotational axis of the compressor wheel and to supply inlet air!in substantially the same condition, to the first passage and to the second passage, and
   a volute to receive pressurized air that is directed radially from an exducer portion of the first compressor face and an exducer portion of the second compressor face to the volute via a common passage disposed intermediate the exdueer portions and the volute wherein an outside surface of the volute and the wall portion of the first passage form, in part, a first section that projects radially inward and extends circularly within the compressor housing and wherein another outside surface of the volute and a wall portion of the second passage form, in part, a second section that projects radially inward and extends circularly within the compressor housing.

2. The compressor of claim 1 wherein the bore of the compressor wheel comprises a partial bore.

3. The compressor of claim 1 wherein the wall portion of the second passage comprises an annular, contoured surface to direct inlet air in a more axial direction toward the second compressor lace.

4. The compressor of claim 3 wherein the wall portion of the second passage comprises an opposing annular, plate-like surface for mounting the compressor housing to a center housing of a turbocharger.

5. The compressor of claim 1 further comprising a backing plate for mounting the compressor housing to a center housing of a turbocharger.

6. The compressor of claim 5 wherein a portion of the backing plate defines, in part, the second passage.

7. The compressor of claim 6 wherein the portion of the backing plate that defines, in part, the second passage comprises an annular, contoured surface to direct inlet air in a more axial direction toward the second compressor face.

8. A turbocharger comprising the compressor of claim 1.

9. A compressor for a turbocharger comprising:
a compressor wheel that comprises first and second compressor faces oriented back-to-back and a bore for mounting the compressor wheel to a shaft along a rotational axis of the compressor wheel; and
a multi-component compressor housing that comprises
a first passage to an inducer portion of the first compressor face wherein an attachable component forms part of the first passage, covers an axial end of the compressor wheel and comprises an annular, contoured surface to direct inlet air in a more axial direction toward the inducer portion of the first compressor face and forms, in part, a first section that projects radially inward and extends circularly within the compressor housing,
a second passage to an inducer portion of the second compressor face,
a bifurcated air inlet oriented to receive inlet air and to supply inlet air to the first passage and to the second passage, and
a volute to receive pressurized air that is directed radially from an exducer portion of the first compressor face and an exducer portion of the second compressor face to the volute via a common passage disposed intermediate the exducer portions and the volute wherein an outside surface of the volute and a wall portion of the second passage form, in part, a second section that projects radially inward and extends circularly within the compressor housing.

10. The compressor of claim 9 wherein the bore of the compressor wheel comprises a partial bore.

11. The compressor of claim 9 wherein a component of the compressor housing comprises an annular, plate-like surface for mounting the compressor housing to a center housing of a turbocharger.

12. The compressor of claim 11 wherein the attachable component attaches to the component that comprises the annular, plate-like surface.

13. A turbocharger comprising the compressor of claim 9.

14. A compressor for a turbocharger comprising:
a compressor wheel that comprises first and second compressor faces oriented back-to-back and a bore for mounting the compressor wheel to a shaft along a rotational axis of the compressor wheel; and
a multi-component compressor housing that comprises
a first component that substantially defines a first passage to an inducer portion of the first compressor face,
a second component that attaches to the first component and substantially defines a second passage to an inducer portion of the second compressor face,
a bifurcated air inlet oriented to receive inlet air and to supply inlet air to the first passage and to the second passage, and
a volute to receive pressurized air that is directed radially from an exducer portion of the first compressor face and an exducer portion of the second compressor face to the volute via a common passage disposed intermediate the exducer portions and the volute wherein an outside surface of the volute and a wall portion of the first component form, in part, a first section that projects radially inward and extends circularly within the compressor housing and wherein another outside surface of the volute and a wall portion of the second component form, in part, a second section that projects radially inward and extends circularly within the compressor housing.

15. The compressor of claim 14 wherein the bore of the compressor wheel comprises a partial bore.

16. A turbocharger comprising the compressor of claim 14.

* * * * *